United States Patent
Heurtefeu et al.

(10) Patent No.: US 11,591,259 B2
(45) Date of Patent: Feb. 28, 2023

(54) ARTICLE COMPRISING A FUNCTIONAL COATING AND A TEMPORARY PROTECTIVE LAYER MADE OF POLYFURANIC RESIN

(71) Applicant: SAINT-GOBAIN GLASS FRANCE, Courbevoie (FR)

(72) Inventors: Bertrand Heurtefeu, Tremblay-en-France (FR); Stéphane Lohou, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 392 days.

(21) Appl. No.: 16/954,852

(22) PCT Filed: Dec. 12, 2018

(86) PCT No.: PCT/FR2018/053229
§ 371 (c)(1),
(2) Date: Jun. 17, 2020

(87) PCT Pub. No.: WO2019/122611
PCT Pub. Date: Jun. 27, 2019

(65) Prior Publication Data
US 2021/0087104 A1 Mar. 25, 2021

(30) Foreign Application Priority Data

Dec. 18, 2017 (FR) ........................ 1762312

(51) Int. Cl.
| | | |
|---|---|---|
| *C03C 17/36* | (2006.01) | |
| *C03C 17/38* | (2006.01) | |
| *C03B 23/023* | (2006.01) | |
| *C03B 25/00* | (2006.01) | |
| *C03B 27/00* | (2006.01) | |
| *C08G 65/36* | (2006.01) | |
| *C08G 16/02* | (2006.01) | |

(52) U.S. Cl.
CPC ............ *C03C 17/38* (2013.01); *C03B 23/023* (2013.01); *C03B 25/00* (2013.01); *C03B 27/00* (2013.01); *C03C 17/366* (2013.01); *C03C 17/3626* (2013.01); *C03C 17/3639* (2013.01); *C03C 17/3644* (2013.01); *C03C 17/3681* (2013.01); *C08G 16/0262* (2013.01); *C08G 65/36* (2013.01); *C03C 2218/11* (2013.01); *C03C 2218/156* (2013.01); *C03C 2218/328* (2013.01); *C03C 2218/355* (2013.01)

(58) Field of Classification Search
CPC ..... C08G 16/0262; C08G 65/36; C08L 71/14; C04B 41/5041; C04B 41/5042; C04B 41/5044; C04B 41/5066; C04B 41/5067; C04B 41/5068; C03C 17/225; C03C 17/23; C03C 17/2456; C03C 17/256; C03C 17/34–38; C03C 2217/212; C03C 2217/22; C03C 2217/228; C03C 2217/229; C03C 2217/281; C03C 17/3644; C03C 17/3647; G02B 1/10; G02B 1/11; G02B 1/113; G02B 1/115; B32B 17/10201; B32B 17/10211
See application file for complete search history.

(56) References Cited

U.S. PATENT DOCUMENTS

| | | | | |
|---|---|---|---|---|
| 4,302,380 A | * | 11/1981 | Hesse | ............... C08G 16/0262 525/481 |
| 4,439,348 A | | 3/1984 | Akerberg | |
| 4,946,592 A | * | 8/1990 | Galaj | ................. B01D 67/0072 210/500.25 |
| 5,332,774 A | | 7/1994 | Klang et al. | |
| 5,866,199 A | | 2/1999 | Swidler et al. | |
| 6,620,493 B2 | * | 9/2003 | Hasegawa | ............ C09D 183/06 351/159.6 |
| 7,658,781 B1 | * | 2/2010 | Waggoner | ............. C04B 35/565 75/238 |
| 2011/0019278 A1 | * | 1/2011 | Aoki | .................... H05K 9/0096 359/585 |
| 2012/0128962 A1 | * | 5/2012 | Westin | .................... B32B 37/12 156/324 |
| 2012/0270968 A1 | * | 10/2012 | Mao | ........................ C09D 5/08 523/400 |
| 2013/0266731 A1 | * | 10/2013 | Tutin | ...................... C08G 8/06 427/342 |
| 2013/0280447 A1 | * | 10/2013 | Suzuki | ..................... B60J 3/007 428/339 |
| 2013/0295399 A1 | * | 11/2013 | Schaefer | ................. C08L 61/26 156/60 |

(Continued)

FOREIGN PATENT DOCUMENTS

| | | | | |
|---|---|---|---|---|
| EP | 1 610 940 A2 | | 1/2006 | |
| EP | 3290465 A1 | * | 3/2018 | ............... C08J 5/04 |

(Continued)

OTHER PUBLICATIONS

International Search Report as issued in International Application No. PCT/FR2018/053229, dated Apr. 16, 2019.

*Primary Examiner* — Z. Jim Yang
(74) *Attorney, Agent, or Firm* — Pillsbury Winthrop Shaw Pitman LLP

(57) ABSTRACT

An article includes a substrate with two main faces defining two main surfaces separated by edges, the substrate carrying a functional coating deposited over at least a portion of a main surface and a temporary protective layer deposited over at least a portion of the coating. The temporary protective layer has a thickness of at least 1 micrometer. The temporary protective layer made of polyfuran resin is obtained from a liquid composition comprising furfuryl alcohol.

18 Claims, No Drawings

(56) References Cited

U.S. PATENT DOCUMENTS

2018/0244949 A1*  8/2018  Wu .................... C08G 18/4854
2020/0002223 A1*  1/2020  Behafarid ................. B32B 7/06
2020/0114626 A1*  4/2020  Wu ......................... B32B 5/024

FOREIGN PATENT DOCUMENTS

| GB | 595 208 A | 11/1947 |
|----|-----------|---------|
| GB | 940 713 A | 10/1963 |
| WO | WO 00/50354 A1 | 8/2000 |
| WO | WO 01/02496 A2 | 1/2001 |
| WO | WO 2004/085135 A2 | 10/2004 |
| WO | WO 2012/123902 A1 | 9/2012 |
| WO | WO 2015/019022 A1 | 2/2015 |
| WO | WO 2016/196561 A1 | 12/2016 |

\* cited by examiner

ARTICLE COMPRISING A FUNCTIONAL COATING AND A TEMPORARY PROTECTIVE LAYER MADE OF POLYFURANIC RESIN

CROSS-REFERENCE TO RELATED APPLICATIONS

This application is the U.S. National Stage of PCT/FR2018/053229, filed Dec. 12, 2018, which in turn claims priority to French patent application number 1762312 filed Dec. 18, 2017. The content of these applications are incorporated herein by reference in their entireties.

The invention relates to the protection of articles, preferably glass articles, carrying at least one functional coating. These articles are intended to undergo stages of transportation, of conversion and/or of storage.

It is known to use articles comprising substrates carrying functional coatings in order to confer, on said substrates, optical properties (mirror or antireflective layers), thermal properties (low-e, solar control or solar protection layers, in particular based on silver layers) or electrical properties (antistatic layers, transparent conductive layers).

Many functional coatings deposited on substrates exhibit a low mechanical strength, in particular a high scratchability and a low resistance to abrasion. Finally, some functional coatings are subject to corrosion during storage, in particular in a humid environment.

In particular, the substrates carrying functional coatings based on metal layers, for example based on silver or on silver-based alloy, exhibit these disadvantages. These coated substrates are generally used in laminated glazing or multiple, double or triple glazing, for "solar control" and/or "low-e" applications. The functional coatings are then deliberately encapsulated in the glazing.

Glass substrates carrying functional coatings of this type are, for example, sold by Saint-Gobain under the Cool Lite® name. These coated substrates exhibit very good optical performance qualities (LT, color) and thermal performance qualities (solar factor). These performance qualities are obtained by virtue of functional coatings comprising complex stacks with in particular more than approximately ten thin layers of different thicknesses and of different natures.

These articles undergo various conversion stages, such as stages of cutting, washing, shaping of the edges, assembling and/or heat treatments of tempering, annealing and/or bending type. It is common and practical to carry out the assembling and/or the various treatments on a site other than that where the article carrying the functional coating is manufactured. These articles thus also undergo stages of storage and of transportation.

The mechanical stresses capable of generating detrimental changes of scratches type are numerous and comprise in particular:
- the stage of storage of the articles after deposition of the functional coating on the production site,
- the stage of movement of the articles, stacked or not, from the production site to the conversion site,
- the stage of shaping and storing on the conversion site,
- the stage of washing in a humid environment carried out, for example, before a heat treatment or an assembling as double glazing (DGU) or as triple glazing (TGU),
- the stages of passing over rolls, for example over the rolls of the oven for the purpose of a heat treatment, in particular in the case of "bifunctionalized" articles carrying functional coatings on each face.

The visibility of the scratches, once created, considerably increases when the article is subjected to a heat treatment of tempering type. The scratchability of such articles is harmful from the viewpoint of the esthetics and of the production output. This is because scratches which are not visible before heat treatment, which are revealed only afterwards, can result in an abnormally high reject rate. The financial loss is then even higher because the article rejected incorporates the cost of the heat treatment. Complex functional coatings and in particular those comprising thin silver-based metal layers also exhibit a low resistance to abrasion. These mechanical stresses can induce defects other than scratches, such as the partial or complete tearing off of one or more layers of the functional coating.

Corrosion phenomena can also occur, depending on the natures of the materials constituting the functional coatings. However, especially, their occurrence is strongly dependent on the conditions of humidity, of temperature and of the duration of the different movement, storage, washing and/or heat treatment stages. The functional coatings comprising in particular metal layers or layers based on hygroscopic oxides are sensitive to humidity.

All defects or scratches of the functional coating, whether due to corrosion or to mechanical stresses, are capable of detrimentally affecting not only the esthetics but also the optical and/or energy performance qualities of the article. The handling of substrates carrying such coatings requires many precautions during the transportation, conversion and/or storage stages.

It is known to protect the surface of a substrate with peelable adhesive polymer films. These films can be deposited in the solid state (such as, for example, in the application EP-A-1 610 940) or in the liquid state (U.S. Pat. No. 5,866,199). These solutions using peelable films exhibit, as disadvantages:
- a high cost,
- a long and tedious peeling stage liable to leave traces of the agent providing the bond between the substrate and the film,
- a possible delamination of the functional coating during the peeling phase, and
- the need to manage the rejects of peeled films.

The deposition of one and the same peelable film in the solid state on large-sized substrates is sometimes difficult and may require the use of several films. Problems arise at the junction of the films:
- either a portion of the functional coating is not covered by one or other of the films and, in this case, the protection is incomplete,
- or the films overlap, which potentially results in risks during the cutting of the substrate.

Polymer films obtained from a liquid phase and which can be removed by cleaning using aqueous solutions have also been developed. The application WO 00/50354 discloses, for example, films obtained from aqueous solutions of acrylic polymers which can be easily removed with water, since the polymer is itself soluble in water.

The application WO 01/02496 discloses a coating intended to temporarily protect a substrate during a transportation, handling or storage stage by the application of a removable protective coating. The coating can be a film obtained from aqueous solutions of polymers. The polymers constituting the film can be chosen from homopolymers or copolymers of starch or of casein, polymers derived from proteins, acrylic polymers, polyacrylamides, polyalkylene oxide polymers, polyvinyl acetate, polyvinyl alcohols, polyvinylpyrrolidone, styrene/acrylic acid copolymers, ethylene/acrylic acid copolymers, cellulose copolymers and cellulose derivatives.

The protective coating is preferably removed by aqueous washing. According to an embodiment which is not preferred, this coating can also be removed by thermal decomposition or combustion.

The temporary protective layers which can be removed during the washing are not capable of protecting the substrate from corrosion by moisture during storage. However, especially, these layers do not protect the functional coating during the washing phases. Furthermore, they in addition exhibit the disadvantage of bringing about contamination of the washing machine of the converter.

The patent application WO2015/019022 describes a glazing comprising a temporary protective layer obtained from a methacrylate layer.

Although this solution is satisfactory, the manufacture of the acrylates, their use on the glazing and the nature of the residues resulting from its removal can present problems, for example in terms of toxicity or also for environmental reasons.

There thus exists a need to temporarily protect the substrates carrying a functional coating during the manufacturing, conversion, transportation and/or storage stages, which results from a product which is essentially natural, relatively inexpensive and easy to employ, while meeting the criteria of scratch resistance. Thus, the temporary protection has to be sufficiently durable to make possible protection of the surface of the substrate both against detrimental physical changes and be easily removable by a heat treatment, such as during a tempering or a bending, without resulting in modifications to the properties of the functional coating which it protects after it has been removed.

To this end, a subject matter of the invention is an article comprising a substrate comprising two main faces defining two main surfaces separated by edges, said substrate carrying:
- a functional coating deposited over at least a portion and preferably all of a main surface and
- a temporary protective layer deposited over at least a portion and preferably all of the functional coating, characterized in that:
- the temporary protective layer has a thickness of greater than 1 micrometer and preferably of less than 50 micrometers,
- the temporary protective layer comprises or preferably consists essentially of a poly(furfuryl alcohol) resin.

Preferably, the substrate carrying the functional coating has not been subjected to heat treatment at a temperature of greater than 400° C.

Preferably again, the products of the polymerization of the furfuryl alcohol represent at least 90% by weight of the weight of the temporary protective layer.

As a rule, the temporary protective layer is directly in contact with the functional coating.

According to the invention, the temporary protective layer is obtained directly on the substrate by polymerization of the appropriate alcohol, preferably in the presence of a catalyst suitable for this purpose, in particular an acid catalyst. Reference may be made, for example, to the patent application WO2012/123902 for an example of process which makes it possible to obtain such a layer.

The temporary protective layer can optionally be hardened by drying, or advantageously by a heat treatment, in particular at a temperature of between 50 and 300° C., or alternatively by IR curing.

The temporary protective layer according to the invention is thus obtained from a liquid composition comprising furfuryl alcohol.

Furfuryl alcohol is obtained by reduction of furfural resulting from cellulose materials or more often from plant waste, such as sugar cane bagasse, cereal bran, olive cakes or softwood. It has been used for several decades in the manufacture of sand casting molds. Unlike other protective coatings already described, it is a natural product which, once prepolymerized in the oligomer form, exhibits less than 1% by weight and preferably less than 0.1% by weight of furfuryl alcohol residue. The polymer does not in itself exhibit any toxicity, just like the residues from its combustion.

The invention thus relates more particularly to the use of a concentrated solution of furfuryl alcohol oligomers in the manufacture of a protective layer for an article composed of a glass coated with a functional coating (solar control type), said protection being provided by this layer positioned above the functional coating.

The liquid composition preferably comprises an acid catalyst, such as a sulfonic acid. Preferably again, it has been found, by the applicant company, that the quality of the deposition on the substrate can be improved by adding a surfactant to the initial composition used as wetting agent, for example a siloxane polyether copolymer or also a propylene oxide and ethylene oxide copolymer.

The polymerization of furfuryl alcohol thus results in polyfuran resins, that is to say liquid compositions containing furfuryl alcohol oligomers and/or polymers, which can advantageously be used as temporary protective coating for a functional coating (in particular comprising layers of silver sensitive to moisture on glass).

The temporary protective layer according to the invention is normally intended to be removed during a heat treatment of tempering, annealing and/or bending type at a temperature sufficient to make possible its removal by thermal decomposition. This temporary protective layer based on poly(furfuryl alcohol) resin can be removed without harming the optical properties of the substrate carrying the functional coating. A one and the same stage of heat treatment of the protected substrate thus makes it possible to remove the protection of the substrate and to confer, on the substrate, certain properties or conformations (tempered and/or bent substrate).

Preferably, the substrate carrying the functional coating has not been subjected to high-temperature heat treatment of tempering, annealing and/or bending type, that is to say to heat treatment at a temperature of greater than 400° C. This means that the article formed by the substrate and the functional coating has not been subjected to high-temperature heat treatment. This also means that the process does not comprise a stage of high-temperature heat treatment, that is to say of heat treatment at a temperature of greater than 200° C. or greater than 400° C., between the deposition of the functional coating and the deposition of the temporary protective layer.

This temporary protective layer essentially comprises organic materials resulting from the polymerization of furfuryl alcohol. The chemical formulation of the polymer makes possible rapid and complete combustion during a heat treatment and generates, during its decomposition, only volatile molecules which are easy to remove and not dangerous to the environment and the operator.

This layer, which is insoluble in water, makes it possible to obtain effective protection during the washing stage and against corrosion by moisture.

Surprisingly, the protection is retained even when the substrate is subjected to successive cutting operations. This is because the protected substrates according to the invention seem protected from the corrosion mechanisms which might become initiated on the one hand on the front face but also starting from the cutting edge. The protected substrates according to the invention can thus be cut several times without having to modify the protective layer and without losing the mechanical and chemical protective functions.

Another subject matter of the invention is the process for the protection of said article and the line for the manufacture of a protected article according to the invention. In the continuation of the text, the preferred embodiments apply in the same way to the different subject matters of the invention: the article, the process and the manufacturing line.

Surprisingly, the temporary protective layer according to the invention can be completely removed during a heat treatment by decomposition without harming the optical, energy or thermal properties conferred on the substrate by the functional coating. These advantageous properties are obtained even when the functional coating has been deposited by magnetron cathode sputtering.

The temporary protective layer according to the invention is intended to be applied preferably at the outlet of the line for the manufacture of the substrates carrying functional coatings. The deposition stage can be easily incorporated in the process for the manufacture of the substrate carrying the functional coating.

The application of a temporary protective layer obtained from a liquid composition by polymerization of furfuryl alcohol is subsequently hardened, preferably by heat treatment or also by IR curing, is particularly advantageous.

The liquid composition exhibits, by virtue of the judicious choice of the additional constituents, such as wetting agents of any known type, such as, for example, siloxane polyether copolymers (for example Tego® Wet 250) or poly(ethylene oxide/propylene oxide) block copolymer (for example Pluronic® P-105), a viscosity suitable for making it possible to easily obtain a temporary protective layer with a thickness of greater than 1 μm and a reactivity sufficient to make possible virtually instantaneous crosslinking over the entire thickness. The chemical nature, the degree of crosslinking, the density and the thickness of the temporary protective layer contribute toward efficient protection against abrasion, the appearance of scratches and corrosion being obtained. These protective properties can thus be obtained even for thicknesses of less than 50 micrometers, indeed even of less than 30 micrometers.

Although the invention is very particularly suitable for the protection of substrates carrying mechanically weak functional coatings, the solution of the invention can be applied, if need be, to the protection of subjects carrying any type of functional coating.

The functional coating comprises at least one functional layer. The functional layer is preferably a layer which can act on solar radiation and/or long wavelength infrared radiation. These functional layers are, for example, functional metal layers based on silver or on silver-containing metal alloy.

The substrate can comprise a functional coating comprising a stack of thin layers successively comprising, starting from the substrate, an alternation of n functional metal layers, in particular of functional layers based on silver or on silver-containing metal alloy, and of (n+1) antireflective coatings, each antireflective coating comprising at least one dielectric layer, so that each functional metal layer is positioned between two antireflective coatings.

The article according to the invention can comprise a stack of thin layers successively comprising, starting from the substrate, an alternation of two functional metal layers, in particular of functional layers based on silver or on silver-containing metal alloy, and of three antireflective coatings, each antireflective coating comprising at least one dielectric layer, so that each functional metal layer is positioned between two antireflective coatings.

The article according to the invention can also comprise a stack of thin layers successively comprising, starting from the substrate, an alternation of three functional metal layers, in particular of functional layers based on silver or on silver-containing metal alloy, and of four antireflective coatings, each antireflective coating comprising at least one dielectric layer, so that each functional metal layer is positioned between two antireflective coatings.

The thickness of the functional coating is preferably:
greater than 100 nm, preferably greater than 150 nm,
less than 300 nm, preferably less than 250 nm.

According to an advantageous embodiment of the invention, the functional coating comprises an upper layer chosen from titanium, zirconium and/or hafnium nitrides, oxides or oxynitrides. The upper layer of the functional coating is the layer furthest from the substrate and/or the layer in direct contact with the temporary protective layer.

The upper layer can in particular be a layer:
of titanium nitride; of zirconium nitride; of hafnium nitride; of titanium zirconium nitride;
of titanium zirconium hafnium nitride;
of titanium oxide; of zirconium oxide; of hafnium oxide; of titanium zirconium oxide; of titanium zirconium hafnium oxide.

The thickness of these upper layers is preferably between 1 and 20 nm and better still between 1 and 5 nm.

According to an alternative form, the upper layer can be a layer of silicon nitride optionally doped with aluminum. The thickness of this upper layer is preferably between 5 and 50 nm and better still between 10 and 50 nm.

The functional coating can be deposited by any known means, such as by magnetic-field-assisted cathode sputtering, by thermal evaporation, by CVD or PECVD, by pyrolysis, by chemical deposition, by sol-gel type deposition or by wet deposition of inorganic layers.

The functional coating is preferably deposited by magnetic-field-assisted cathode sputtering. According to this advantageous embodiment, all the layers of the functional coating are deposited by magnetic-field-assisted cathode sputtering. The temporary protective layer is advantageously directly in contact with the functional coating.

The temporary protective layer is essentially of organic nature. The products resulting from the polymerization of the furfuryl alcohol represent at least 90% by weight of the weight of the temporary protective layer after said polymerization.

According to an advantageous embodiment, the temporary protective layer does not comprise inorganic bulking substance, such as fillers or pigments.

The temporary protective layer exhibits a thickness:
of greater than 1 micrometer, preferably of greater than 5 micrometers,
of less than 100 micrometers, preferably of less than 50 micrometers,
of between 2 and 100 micrometers, between 5 and 50 micrometers or between 10 and 30 micrometers.

The invention also relates to a process for the protection of an article comprising a substrate comprising two main faces defining two main surfaces separated by edges, said substrate, preferably glass substrate, carrying a functional coating deposited over at least a portion of a main surface, said protection process comprising the following stages:

preparing a liquid composition comprising furfuryl alcohol, applying the composition to at least a portion of the functional coating over a thickness of at least 1 micrometer, polymerizing the composition so as to form the temporary protective layer made of a poly(furfuryl alcohol) resin.

According to advantageous embodiments of a process according to the invention, the liquid composition applied to the substrate exhibits the following characteristics:

The liquid composition comprises an acid catalyst of the polymerization reaction.

The acid catalyst is chosen from sulfonic acids, in particular p-toluenesulfonic acid, pentylsulfonic acid, hexadecylsulfonic acid, tetradecylsulfonic acid, decylsulfonic acid or dodecylsulfonic acid, or phosphoric acids.

The liquid composition comprises a surfactant (or a wetting agent) chosen in particular from the group consisting of siloxane polyethers or poly(ethylene oxide-b-propylene oxide) block copolymers.

The liquid composition exhibits a viscosity, measured at 25° C.:

of at least 0.05 Pa·s, of at least 0.08 Pa·s, of at least 0.1 Pa·s, of at least 0.50 Pa·s, of at most 5 Pa·s, of at most 2 Pa·s, of between 0.05 and 5 Pa·s.

The liquid composition additionally comprises at least one additive chosen from plasticizers, absorbers, separating agents, heat stabilizers and/or light stabilizers, thickening agents or surface modifiers, the sum of said additives is between 0% and 5% by weight of the weight of the liquid composition.

The liquid composition can be applied at ambient temperature by any known means and in particular by roll-to-roll coating, by spraying, by dipping, by curtain coating or by gunspraying. The liquid composition is preferably applied by roll-to-roll coating. The rate of deposition of the liquid composition can be between 1 and 90 m/min.

The temporary protective layer can be hardened:

by drying at a temperature of less than 200° C. for a period of time ranging, for example, from 3 minutes to 30 minutes, in particular from 5 to 20 minutes, by IR irradiation.

The substrate to be protected has to withstand a heat treatment above 200° C., preferably above 400° C. The invention thus relates to any substrate consisting of materials which are resistant at these temperatures without major detrimental change. Mention may be made, by way of substrate, of glass substrates, glass-ceramic substrates, ceramic substrates, steel substrates, metal substrates where the metal has a melting point of greater than 250° C. The substrate is preferably a glass substrate.

Advantageously, the substrate carrying the temporary protective layer has not been subjected to heat treatment of tempering, annealing and/or bending type, that is to say to heat treatment at a temperature of greater than 200° C.

The glass substrate can be flat, colorless and/or tinted. The thickness of the substrate is preferably between 1 and 19 mm, more particularly between 2 and 10 mm, indeed even between 3 and 6 mm.

According to an alternative form of the invention, the temporary protective layer can be used to protect the functional coating during a stage of deposition of another coating. This other coating can be deposited over a portion of the main surface of the substrate carrying the functional coating or over a portion of the main surface of the substrate not carrying the functional coating.

It is in particular known that, in order to obtain bifunctionalized articles carrying a functional coating on each main face of the substrate, contact of the functional coating deposited first with the rolls of the deposition device during the second pass making possible the deposition of the second coating results in damaging detrimental changes in the quality of the first coating (contamination, scratches). These detrimental changes become visible after deposition of the second functional coating and optionally tempering. The invention makes it possible to overcome this problem by protecting the first coating by a protective layer intended to disappear during the tempering or the bending of the bifunctionalized article.

According to another alternative form of the invention, the temporary protective layer can be used to protect the back surface of the article during the deposition of a functional coating. This is because the passage over the rolls of the back face of an article, for example a glass article, during the deposition of a functional coating is capable of partially detrimentally affecting said surface (soiling, scratch). The invention makes it possible to overcome this problem by protecting the back surface of the article before deposition of the first coating.

The temporary protective layer can be deposited:

over each of the main surfaces of the substrate, and/or over at least one edge of the substrate, and/or over each of the edges of the substrate.

When the temporary protective layer is deposited over each of the main surfaces of the article and over each of the edges of the article, chemical and/or mechanical protection is then conferred over the entire surface of the article.

The temporary protective layer can be deposited over a glass substrate before or after a cutting stage, that is to say over a glass substrate at the final size or close to the final size (crude).

At the end, after the different possible stages mentioned above of the protected substrate, in particular of storage, of movement, of shaping, of washing, of passing over rolls, the temporary protection is removed.

A complete process for protection according to the invention of an article as described above thus comprises the following stages:

preparing a liquid composition comprising furfuryl alcohol, applying the composition to at least a portion of the functional coating over a thickness of at least 1 micrometer, polymerizing the composition so as to form a temporary protective layer made of poly(furfuryl alcohol) resin, removing said temporary protective layer, in particular by a heat treatment at a temperature of greater than 300° C., in particular of tempering, annealing and/or bending type.

The protection process normally comprises, at the end, the stage of removal of said temporary protective layer by a high-temperature heat treatment. The heat treatment temperature is typically greater than 400° C., indeed even greater than 450° C. The heat treatments are chosen from an annealing, for example from a flash annealing, such as a laser or flame annealing, a tempering and/or a bending.

The heat treatment necessary to remove the protective layer can be an annealing in a static or dynamic oven. The heat treatment can then have the objective of improving the crystallization of one or more layers included in the stack to be protected.

The functional coating comprises at least one functional layer deposited during a stage of deposition by magnetron.

The temporary protective layer is formed immediately after the stage of deposition of the functional coating. According to the invention, it is considered that the temporary protective layer can be formed "immediately after" when the temporary protective layer can be formed less than 10 minutes, preferably less than 5 minutes and better still less than 1 minute after the stage of deposition of the functional coating.

The invention also relates to a line for the manufacture of an article comprising a substrate comprising two main faces defining two main surfaces separated by edges, said substrate carrying:
- a functional coating deposited over at least a portion of a main surface and
- a temporary protective layer deposited over at least a portion of the functional coating, which layer is obtained from a liquid composition, characterized in that it comprises:
i) a device for the deposition of a functional coating,
ii) a device for the deposition and polymerization of a liquid composition as described above comprising a means of storage and a means which makes possible the application in the form of a layer of said liquid composition,
iii) means which make it possible to move said substrate from the devices i) to iii).

The device for deposition of a functional coating can be a device for deposition by pyrolysis, a device for chemical deposition and preferably a magnetic-field-assisted (magnetron) cathode sputtering device.

The device for deposition of a liquid composition comprising a means of storage and a means which makes possible the application in the form of a layer of said liquid composition is preferably a roll-to-roll coating device. This device can comprise an application roll and a backing roll. The liquid composition can then be conveyed by pumping into the space defined between the two rolls constituting a storage means and applied by driving of the rolls.

The protected glass article or substrate according to the invention can be stacked without cross contamination or appearance of mechanical scratches, immediately after deposition of the functional coatings.

The protected glass article according to the invention advantageously corresponds to the following criteria:
- mechanical scratch protection which is reflected, for example, by a resistance in the Erichsen scratch test (EST) of at least 4N, indeed even of at least 7N,
- protection from the mechanical stresses of the conversion which is reflected by an increased resistance of the functional coating located under the protective layer to the various storage method, to the washing machine brush, to shaping and to cutting,
- resistance of the protective layer during the tempering for a time sufficient for the glass to remain highly emissive over a period of time which makes possible a significant saving in energy,
- excellent adhesion of the protective layer to the functional coating in order to withstand, without delamination, all the conversion stages before tempering,
- removal of the temporary protective layer without leaving mineralized residues in the event of tempering or bending, whatever the type of heating (radiative/convective).

EXAMPLES

I. Materials Used
1. Substrates and Functional Layers

The substrates used are flat glass substrates with a thickness of approximately 6 mm obtained by a float glass process which consists in pouring the molten glass over a bath of tin.

Functional coatings conferring solar control properties comprising a stack of thin layers were deposited by virtue of a magnetic-field-assisted (magnetron) cathode sputtering device.

The functional coating, known below as Ag trilayers (Cool-Lite Xtrem® 70/33 II sold by the applicant company), successively comprises, starting from the substrate, an alternation of three silver layers (functional metal layers) and of four antireflective coatings, each antireflective coating comprising at least one dielectric layer, so that each functional metal layer is positioned between two antireflective coatings. The total thickness of this functional coating is of the order of 200 nm.

2. Temporary Protective Layer

Liquid compositions are produced with the BioRez™ polyfuran (or poly(furfuryl alcohol)) resin sold by Trans-Furans Chemicals, Belgium. The resin is obtained by polycondensation of furfuryl alcohol in the presence of an acid catalyst. It exhibits an acid pH of approximately 5, a low content of residual furfuryl alcohol (less than 1%) and a viscosity at 25° C. of less than 1000 mPa·s. 0.17% by weight of Tego® Wet 250 wetting agent from Evonik (siloxane polyether copolymer) is added to the resin. The mixture is subsequently deposited using a Meyer rod over the functional coating deposited beforehand over the substrate.

Once deposited over the glass, the coating is hardened by a heat treatment at 200° C. for 15 minutes.

These tests were carried out on two samples produced as described above but in which a different amount of the polyfuran resin was deposited. After drying, the thicknesses for the temporary protective layer are 13 and 20 μm for the two samples, respectively C1 and C2.

The main characteristics of the samples C1 and C2 and of the process for obtaining them are given in table 1 below:

TABLE 1

|  | C1 | C2 |
| --- | --- | --- |
| Wet thickness (μm) | 24 | 40 |
| Curing time 200° C. | 15 min | 15 min |
| Curing type | oven | oven |
| Homogeneous deposition after curing | Yes | Yes |
| Coating thickness (μm) after curing | 13 | 20 |

II. Evaluation of the Mechanical Properties

The substrates are subjected to thermal tempering under the following conditions: 730° C. for 240 seconds. Then an Erichsen scratch test (EST) is carried out.

The Erichsen test consists in giving the value of the force necessary, in newtons, to produce a scratch in the stack (Van Laar tip, steel ball).

The following assessment indicators were used:
"+": no scratch,
"0": noncontinuous scratches,
"−": continuous scratches.

A reference substrate carrying a functional coating without a temporary protective layer is compared with the two substrates carrying a functional coating and a temporary protective layer with a thickness of 13 and 20 micrometers (μm). The test was carried out on different places of the surface of one and the same substrate. These examples clearly show the excellent scratch resistance of the protected articles according to the invention, as given in table 2 which follows.

TABLE 2

| Erichsen test | 0.1 | 0.5 | 0.7 | 1 | 4 | 7 |
|---|---|---|---|---|---|---|
| Reference | + | + | + | 0 | − | − |
| C1-13 μm | + | + | + | + | + | 0 |
| C1-20 μm | + | + | + | + | + | + |

The reference substrate or article comprises, from 1N, according to the Erichsen test, fine scratches and, at 4N, numerous continuous scratches which are very visible and homogeneous in thickness. One and the same substrate protected by a temporary protective layer according to the invention comprises very few scratches after tempering for forces applied up to at least 7N. Furthermore, the scratches are noncontinuous.

These tests show that an article carrying a protective layer with a thickness of 13 μm can be regarded as effectively protected.

III. Evaluation of the Properties after Tempering

The colorimetric variation ΔE brought about by the tempering on the side of the functional coating, in reflection, was calculated. For this:
the colors in reflection L*, a* and b* in the LAB system, measured according to the illuminant D65, layers side, are measured before the deposition of the protective layer and after the tempering, and
the variation is measured in the following way: $\Delta E = (\Delta a^{*2} + \Delta b^{*2} + \Delta L^{*2})^{1/2}$.

No colorimetric variation attributable to the presence of the temporary protective layer is observed, the ΔE measured on the samples C1 and C2 being substantially equal to that measured on the reference sample.

This means that the deposition and the removal of the temporary protective layer does not bring about a modification to the properties of the protected stack.

The invention claimed is:

1. An article comprising a substrate comprising two main faces defining two main surfaces separated by edges, said substrate carrying:
   a functional coating deposited over at least a portion of a main surface and
   a temporary protective layer deposited over at least a portion of the functional coating,
   wherein:
   the temporary protective layer has a thickness of greater than 1 micrometer,
   the temporary protective layer comprises or consists essentially of a poly(furfuryl alcohol) resin,
   wherein the functional coating comprises a stack of thin layers successively comprising, starting from the substrate, an alternation of n functional metal layers based on silver or on silver-containing metal alloy, and (n+1) antireflective coatings, each antireflective coating comprising at least one dielectric layer, so that each functional metal layer is positioned between two antireflective coatings.

2. The article comprising a substrate as claimed in claim 1, wherein the substrate carrying the functional coating has not been subjected to heat treatment at a temperature of greater than 400° C.

3. The article comprising a substrate as claimed in claim 1, wherein the products of the polymerization of the furfuryl alcohol represent at least 90% by weight of the weight of the temporary protective layer.

4. The article comprising a substrate as claimed in claim 1, wherein the temporary protective layer is deposited:
   over each of the main surfaces of the substrate and/or
   over at least one edge of the substrate and/or
   over each of the edges of the substrate.

5. The article comprising a substrate as claimed in claim 1, wherein the temporary protective layer is directly in contact with the functional coating.

6. The article as claimed in claim 1, wherein said substrate is made of glass, of glass-ceramic, of ceramic, of steel or of a metal having a melting point of greater than 250° C.

7. The article as claimed in claim 1, wherein said substrate is made of glass.

8. The article comprising a substrate as claimed in claim 1, wherein the thickness of the temporary protective layer is less than 100 micrometers.

9. An article comprising a substrate comprising two main faces defining two main surfaces separated by edges, said substrate carrying:
   a functional coating deposited over at least a portion of a main surface and
   a temporary protective layer deposited over at least a portion of the functional coating,
   wherein:
   the temporary protective layer has a thickness of greater than 1 micrometer,
   the temporary protective layer comprises or consists essentially of a poly(furfuryl alcohol) resin, and
   the functional coating comprises an upper layer chosen from a metal nitride, a metal oxide or a metal oxynitride and the metal is one or more selected from the group consisting of titanium, zirconium and hafnium.

10. The article comprising a substrate as claimed in claim 9, wherein the upper layer is chosen from a layer:
   of titanium nitride; of zirconium nitride; of hafnium nitride; of titanium zirconium nitride; of titanium zirconium hafnium nitride,
   of titanium oxide; of zirconium oxide; of hafnium oxide; of titanium zirconium oxide; of titanium zirconium hafnium oxide.

11. A process for the protection of an article comprising a substrate comprising two main faces defining two main surfaces separated by edges, said substrate carrying a functional coating deposited over at least a portion of a main surface, said protection process comprising the following stages:
   preparing a liquid composition comprising furfuryl alcohol,
   applying the composition to at least a portion of the functional coating over a thickness of at least 1 micrometer,
   polymerizing the composition so as to form a temporary protective layer a poly(furfuryl alcohol) resin,
   wherein the functional coating comprises a stack of thin layers successively comprising, starting from the substrate, an alternation of n functional metal layers based on silver or on silver-containing metal alloy, and (n+1) antireflective coatings, each antireflective coating comprising at least one dielectric layer, so that each functional metal layer is positioned between two antireflective coatings.

12. The process for the protection of an article as claimed in claim 6, wherein the liquid composition comprises an acid catalyst of the polymerization reaction.

13. The process for the protection of an article as claimed in claim 6, wherein the liquid composition comprises a wetting agent or surfactant.

14. The process for the protection of an article as claimed in claim 11, wherein the substrate is a glass substrate.

15. The process for the protection of an article as claimed in claim 11, further comprising
removing said temporary protective layer.

16. The process for the protection of an article as claimed in claim 15, wherein the substrate is a glass substrate.

17. The process for the protection of an article as claimed in claim 15, wherein the temporary protective layer is removed by a heat treatment at a temperature of greater than 300° C.

18. The process for the protection of an article as claimed in claim 17, wherein the temporary protective layer is removed by tempering, annealing and/or bending.

* * * * *